United States Patent Office 2,908,715
Patented Oct. 13, 1959

2,908,715

PROCESS FOR PREPARING FORMALIN BY OXIDATION OF METHANOL

Takashi Eguchi, Tamechika Yamamoto, and Saburo Yamauchi, Niigata City, Japan

No Drawing. Application July 5, 1956
Serial No. 595,867

4 Claims. (Cl. 260—603)

The present invention relates to a new process for preparing formalin by oxidation of methanol.

Hitherto, in connection with processes for manufacturing formalin by oxidation of methanol, various theoretical considerations have been taken into account and many improvements have been made in an effort to obtain the product in good yield.

Namely; many studies have been made concerning
(1) The selection of the catalyst,
(2) The form of the catalyst and the depth of the catalyst layer,
(3) The process for removing the reaction heat,
(4) The mixing ratio of methanol and air,
(5) The flow rate of the mixture of methanol and air, and so forth.

When the oxidation reaction is considered from the theoretical point of view, various reactions such as those below-mentioned may take place:

$$CH_3OH \rightleftharpoons HCHO + H_2 \quad (1)$$
$$CH_3OH + O \rightarrow HCHO + H_2O \quad (2)$$
$$CH_3OH \rightleftharpoons CO + 2H_2 \quad (3)$$
$$HCHO \rightleftharpoons CO + H_2 \quad (4)$$
$$HCHO + O_2 \rightarrow CO_2 + H_2O \quad (5)$$
$$HCHO + O \rightarrow HCOOH \quad (6)$$

Equation 1 indicates that formaldehyde and hydrogen are formed by the dehydrogenation of methanol and when the hydrogen is oxidized into water by oxygen, the Reaction 1 proceeds to the right and consequently the formation of formaldehyde occurs smoothly. Hence, the above reaction may also be expressed as Reaction 2.

However, for this reaction to proceed properly, it is necessary that reaction conditions be ideal. This reaction is accompanied by a large amount of reaction heat and therefore, regulation of the reaction conditions is not easily carried out in actual operation. As evidence of this fact, we can point out that the waste gas which is discharged from the formalin manufacturing factory after oxidation of methanol contains carbon dioxide or carbon monoxide. This means that part of the methanol is converted to substances other than formaldehyde. A formalin solution consisting of 10% of methanol, 37% of formaldehyde, and 53% of water by weight should theoretically be obtained at a rate of 2.02 tons from 1 ton of methanol; but actual data indicate that 1.7–1.9 tons of methanol are usually obtained. This means that the difference is consumed by the side reactions which are undesirable from the standpoint of the main reaction. Although various catalysts have been employed for preventing the occurrence of side reactions and the equipment has been carefully designed, the yield has not been improved, because this reaction generates a large amount of reaction heat and it is very difficult to prevent local overheating of the catalyst. When many reaction vessels of small diameters are employed, it is very difficult to uniformly adjust them to the most suitable conditions and in the case of reaction vessels of large diameters it is difficult to remove the reaction heat uniformly.

In an effort to solve this problem, the following procedures have been considered.

(1) To prevent overheating by dissipating the reaction heat with molten salts, molten metals, or high boiling organic substances.
(2) To remove the heat of the catalyst indirectly by air.
(3) To prevent excessive progress of the exothermic reaction by using methanol which is diluted with water or by using a mixed vapor of methanol and water or other substances.
(4) To directly adjust the temperature of the catalyst by changing the mixing ratio of methanol and air or by changing the flow velocity of the mixture and to prevent secondary reactions by rapidly cooling the reaction products after they come out of the reaction system.

However, it was not easy to obtain a high yield of more than 95% based on the theoretical in actual operation.

As a result of our fundamental researches and pilot plant experiments relating to the oxidation of methanol, we have invented a new process. In accordance with our process, when a mixture of methanol vapor and air at a given rate is reacted by passing through the oxidation catalyst, the oxidation products are rapidly cooled by countercurrently spraying water, methanol, or aqueous formalin solution or a mixture of these substances on the back or under surface of the catalyst and the temperature of the catalyst is also adjusted by this spray. We have obtained good results by employing this new method for the oxidation of methanol into formalin.

The invention is carried out effectively by passing the mixture of methanol and air through the catalyst layer from the upper surface downwardly to the lower surface of the layer, and by spraying water, methanol, or aqueous formalin solution upwardly as a cooling agent onto the back or under surface of the catalyst layer. According to the conventional methods which have been carried out hitherto with reaction vessels which have large diameters, it is difficult to adjust the reaction temperature smoothly, and for this reason many reaction vessels which have smaller diameters have been used for this purpose. On the contrary, as a feature of this invention, we have found that highly effective operation is obtained when use is made of a large diameter reaction vessel; and we have made many tests by employing reaction vessels having diameters between 47 mm. and 680 mm. and we have obtained satisfactory results. Further, we have confirmed that the above mentioned principle can be applied similarly to operation with reaction vessels having larger diameters. And yet, this procedure can be carried out with immediate effect solely by adjusting the amount of the cooling agent which is to be sprayed on the back of the catalyst layer in the reaction vessel. As an example, we can obtain ideal operation with the content of carbon monoxide in the waste gas reduced to zero throughout the entire period of long term operation, and we can maintain a high yield of formalin production per unit sectional area of the catalyst layer. We tested the quality of the formalin thus prepared by this method, and we could not find any impurities of the type found in material prepared by conventional methods. For example, even when crude formalin water was sprayed into the reaction vessel, the content of formic acid was only about 200 p.p.m.

The desired amount of the aforementioned cooling liquid (formalin, aqueous methanol solution, or water) is the amount which is required to keep the temperature of waste gas (immediately after passing through the catalyst layer) between about 150 and 400° C. For this purpose, when a formalin solution is employed as cooling liquid, the amount of liquid required, for example, is 1.5~2.5 times the quantity of methanol used. When water is used and if the concentration of the produced formalin is not important, the amount of water to be sprayed is nearly the same as the amount of formalin mentioned above, but if it is necessary to keep the concentration of formalin above a certain limit, it generally is possible to attain the object with a limited amount of cooling liquid which is, for example, about half of the quantity of methanol used. And when an aqueous methanol solution is used, the amount of cooling liquid may be selected proportionately to the above-mentioned two cases.

Example 2

Twelve and seven-tenth liters of silver catalyst of 16~32 mesh (depth of the catalyst bed is 3.5 cm.) were introduced into a stainless steel vertical reaction vessel having a diameter of 680 mm. which was being used for industrial production, formalin production was studied in the same way as described in Example 1. The results of the experiments are described in the following table. Thirty-three of the cooling liquid spray pipes were employed for these experiments and the spray was made uniformly onto the lower surface of the catalyst bed.

| Experiments reference number | $T_1$ | $T_3$ | $T_4$ | $T_7$ | $T_{11}$ | $T_{12}$ | $T_{14}$ | $T_{17}$ | $T_{18}$ |
|---|---|---|---|---|---|---|---|---|---|
| Amount of methanol used: | | | | | | | | | |
| kg./h. | 100 | 236 | 236 | 286 | 286 | 329 | 400 | 557 | 557 |
| g./cm.$^2$ min. | 0.460 | 1.086 | 1.086 | 1.316 | 1.316 | 1.513 | 1.840 | 2.562 | 2.562 |
| Amount of air used (m.$^3$/h.) | 64 | 160 | 160 | 220 | 260 | 270 | 300 | 429 | 463 |
| Air/methanol (l./g.) | 0.640 | 0.667 | 0.667 | 0.770 | 0.910 | 0.821 | 0.750 | 0.770 | 0.832 |
| Spray of cooling liquid (crude formalin solution) | none | none | sprayed | sprayed | sprayed | sprayed | sprayed | sprayed | sprayed |
| $CO_2$ content in the waste gas (percent) | 2.1 | 1.9 | 1.9 | 2.2 | 3.0 | 2.3 | 2.6 | 2.8 | 3.2 |
| CO content in the waste gas (percent) | 0.6 | 2.7 | 0.1 | 0.0 | 0.1 | 0.0 | 0.0 | 0.0 | 0.0 |
| Conversion rate of methanol (percent)[1] | 46.9 | 50.9 | 54.9 | 63.3 | 77.3 | 67.3 | 64.5 | 65.0 | 71.3 |
| Yield in theory (percent)[2] | 95.6 | 90.6 | 96.8 | 96.5 | 94.8 | 96.3 | 95.8 | 95.0 | 94.5 |
| Amount of 37% formalin cont'g 10% of methanol produced from 1 ton of methanol consumed (t) | 1.96 | 1.87 | 1.97 | 1.97 | 1.94 | 1.97 | 1.96 | 1.95 | 1.94 |
| Daily production amount of 37% formalin per each reaction vessel (t/vessel/day) | 2.7 | 6.5 | 7.6 | 10.6 | 12.7 | 12.9 | 15.0 | 21.0 | 23.3 |

[1] Amount of methanol in grams which is passed through unit section area (cm.$^2$) of catalyst layer per minute.
[2] Same as the note in the table of Example 1.

Example 1

A vertical reaction vessel made of copper having a diameter of 47 mm. was filled with a silver catalyst of 16–32 mesh, and a mixture of air and methanol was passed downwardly through the catalyst bed from the upper surface to the lower surface of the bed, while crude formalin solution was uniformly sprayed upwardly as a cooling liquid onto the whole back or under surface of the catalyst bed. Thus, formalin was prepared under the following various conditions, and the results are described in the following table.

From the above experiments, it will be seen that even when a large-diameter-reaction-vessel having a diameter of 680 mm. is used, side reactions can be suppressed by spraying cooling liquid according to the present invention. And it also will be seen that, when the operation is carried out at a rate of 60–70% of methanol conversion, 10–20 tons of 37% formalin can be produced daily in a yield of 95–97% (theoretical basis), and when the methanol conversion rate is 70–80%, 10–20 tons per day of 37% formalin can be produced in a yield of 94–95%. Further, it is clearly seen by comparing $T_1$ with $T_{17}$ that even in the case of the same theoretical yield, the production capacity of $T_{17}$ can be increased to about eight times that of $T_1$ by spraying cooling liquid.

| Experiments reference number | 83 | 91 | 96 | 97 | 98 | 99 |
|---|---|---|---|---|---|---|
| Amount of catalyst used (cc.) | 130 | 130 | 43 | 43 | 43 | 43 |
| Depth of catalyst layer (cm.) | 7.5 | 7.5 | 2.5 | 2.5 | 2.5 | 2.5 |
| Amount of methanol used (kg./h.) | 5.35 | 5.26 | 6.69 | 6.69 | 8.35 | 8.35 |
| Air/Methanol (l./g.) | | | | | | |
| Space velocity (l./l./h.) | 67.600 | 67.600 | 264.000 | 264.000 | 313.000 | 313.500 |
| Spray of cooling liquid (formalin) | none | sprayed | none | sprayed | none | sprayed |
| Reaction temperature (max.) °C | 659 | 500 | 680 | 605 | 670 | 610 |
| $CO_2$ content in waste gas (percent) | 2.7 | 2.7 | 3.0 | 2.7 | 3.0 | 2.7 |
| CO content in waste gas (percent) | 2.8 | 0.0 | 3.9 | 0.0 | 2.9 | 0.0 |
| Conversion rate of methanol (percent)[1] | 75.3 | 78.2 | 77.9 | 80.2 | 71.2 | 74.4 |
| Yield in theory (percent)[2] | 90.1 | 95.4 | 86.0 | 95.4 | 88.9 | 95.3 |
| Amount of 37% formalin solution containing 10% of methanol produced from 1 ton of methanol consumed (ton) | 1.87 | 1.96 | 1.79 | 1.96 | 1.84 | 1.96 |

[1] Methanol converted×100/methanol charged.
[2] Formaldehyde produced×100/formaldehyde calculated from the amount of methanol converted.

From the results of the above-mentioned experiments, it may clearly be seen how the spray of cooling liquid according to the present invention is effective for reducing side reactions, and accordingly, is effective for increasing the yield of formalin and for reducing the reaction temperature.

Example 3

Vertical reaction vessels having diameters of 47 mm., 100 mm., 230 mm., and 680 mm. were each filled with silver catalyst of 16–32 mesh, and experiments in formalin preparation were made in the same way as described in Example 1. The results of the experiments are described in the following table.

| Experiments reference number | 95 | 234 | 254 | T₁₁ |
|---|---|---|---|---|
| Diameter of reaction vessel (mm.) | 47 | 100 | 230 | 680 |
| Amount of catalyst used (cc.) | 43 | 200 | 1,246 | 12,700 |
| Amount of methanol used: | | | | |
| kg./h | 5.30 | 16.50 | 34.1 | 286.0 |
| g./cm.²/min* | 5.22 | 3.49 | 1.37 | 1.32 |
| Air/methanol (l./g.) | 0.993 | 0.990 | 0.989 | 0.910 |
| Space velocity (l./l./h.) | 207,000 | 133,000 | 46,100 | 37,800 |
| Spray of cooling liquid (crude formalin solution) | sprayed | sprayed | sprayed | sprayed |
| CO₂ content in the waste gas (percent) | 2.9 | 2.9 | 3.3 | 3.0 |
| CO content in the waste gas (percent) | 0.0 | 0.3 | 0.0 | 0.1 |
| Conversion rate of methanol (percent)¹ | 79.9 | 71.7 | 77.3 | 77.3 |
| Yield in theory (percent)² | 95.1 | 94.6 | 94.3 | 94.8 |
| Amount of 37% formalin cont'g 10% of methanol produced from 1 ton of methanol consumed (t) | 1.95 | 1.94 | 1.94 | 1.94 |

* Same as in the table of Example 2.
¹,² Same as footnotes 1 and 2 in the table of Example 1.

From the results of the above-mentioned experiments, we have confirmed that, when the treatment of this invention is carried out, the yield of formalin is constantly kept high without regard to the diameter of reaction vessel. And we can estimate that a larger reaction vessel having a diameter larger than that of this case can be used for preparing formalin by employing the spraying cooling liquid according to this invention.

Example 4

Rolled net of silver catalyst (BS No. 31, 32 mesh) was introduced into a copper vertical reaction vessel having a diameter of 47 mm., and a mixture of air and methanol was passed downwardly through the catalyst bed from the upper side to the lower side of said bed, while aqueous methanol solution of 60% by weight was uniformly sprayed upwardly as a cooling liquid onto the surface of the lower side of the catalyst bed. Thus, experiments in preparing formalin under the below-mentioned conditions were carried out, the results of which are described in the following table.

| Experiments reference number | 102 | 103 | 104 | 105 |
|---|---|---|---|---|
| Depth of catalyst layer (cm.) | 2.5 | 2.5 | 7.5 | 7.5 |
| Space velocity (l./l./h.) | 266,200 | 267,800 | 89,000 | 88,200 |
| Air/methanol (l./g.) | 0.975 | 0.982 | 1.005 | 0.996 |
| Spray of cooling liquid (aqueous methanol solution) | none | sprayed | none | sprayed |
| Temperature of waste gas ° C. (right under the catalyst) | 676 | 150 | 690 | 140 |
| CO₂ content in the waste gas (percent) | 3.6 | 3.3 | 3.8 | 3.6 |
| CO content in the waste gas (percent) | 3.8 | 0.0 | 4.2 | 0.0 |
| Conversion rate of methanol (percent)¹ | 86.3 | 71.3 | 75.8 | 77.5 |
| Yield in theory (percent)² | 85.2 | 94.3 | 83.3 | 93.3 |
| Amount of 37% formalin solution cont'g 10% of methanol produced from 1 ton of methanol consumed (t) | 1.77 | 1.93 | 1.74 | 1.92 |

¹ Methanol converted×100/methanol charged.
² Formaldehyde produced×100/formaldehyde calculated from the amount of methanol converted.

The results of the above-mentioned experiments indicate that the spray of cooling liquid (aqueous methanol solution) effectively suppresses the occurrence of decomposition reactions, as is known from the CO content in the waste gas, and accordingly increases the yield of formalin.

Example 5

Rolled net silver catalyst (BS No. 31, 32 mesh) was supplied to a copper vertical reaction vessel having a diameter of 47 mm., and a mixture of air and methanol was passed downwardly through the catalyst bed from the upper side to the lower side of said bed, while water was uniformly sprayed upwardly as a cooling liquid onto the surface of the under side of the catalyst bed. Thus, formalin preparation under the below-mentioned conditions was carried out, the results of which are described in the following.

| Experiment reference number | 92 | 93 | 94 | 94 | 100 | 101 |
|---|---|---|---|---|---|---|
| Depth of catalyst layer (cm.) | 7.5 | 7.5 | 2.5 | 2.5 | 2.5 | 2.5 |
| Space velocity (l./l./h.) | 74,100 | 74,100 | 204,000 | 204,000 | 332,000 | 333,000 |
| Air/methanol (l./g.) | 1.112 | 1.112 | 0.934 | 0.926 | 1.023 | 1.028 |
| Spray of cooling liquid (water) | none | sprayed | none | sprayed | none | sprayed |
| Reaction temperature, ° C | 685 | 597 | 635 | 572 | 690 | 600 |
| CO₂ content in the waste gas (percent) | 3.9 | 3.8 | 3.0 | 3.0 | 3.4 | 3.2 |
| CO content in the waste gas (percent) | 2.6 | 0.7 | 2.0 | 0.4 | 4.8 | 0.2 |
| Conversion ratio of methanol (percent)¹ | 84.4 | 85.6 | 73.8 | 73.1 | 71.3 | 77.8 |
| Yield in theory (percent)² | 87.2 | 91.6 | 90.8 | 94.0 | 82.5 | 93.7 |
| Amount of 37% formalin solution cont'g 10% of methanol produced from 1 ton of methanol consumed | 1.81 | 1.89 | 1.88 | 1.93 | 1.73 | 1.92 |

¹ Methanol converted×100/methanol charged.
² Formaldehyde produced×100/formaldehyde calculated from the amount of methanol converted.

According to the results of the above-mentioned experiments, it can be clearly understood how the use of spraying water as a cooling liquid is effective for reducing side reactions, and accordingly, is effective for increasing the yield of formalin.

We claim:
1. In a process for the preparation of formalin by oxidation of methanol in an oxidation zone containing